(12) United States Patent
Smith et al.

(10) Patent No.: US 7,673,982 B2
(45) Date of Patent: Mar. 9, 2010

(54) PRINT MEDIA STACKER

(75) Inventors: Richard Smith, Fairport, NY (US); Benjamin Cuyler, Jr., Willingboro, NJ (US); George A. Rears, Mount Laurel, NJ (US); Ken Gravenstede, Lima, NY (US); Barry L. McElreath, Moorestown, NJ (US); Mark Bratcher, Webster, NY (US); James Mason, Webster, NY (US)

(73) Assignee: Oki Data Americas, Inc., Mount Laurel, NJ (US)

( * ) Notice: Subject to any disclaimer, the term of this patent is extended or adjusted under 35 U.S.C. 154(b) by 1738 days.

(21) Appl. No.: 10/818,421

(22) Filed: Apr. 5, 2004

(65) Prior Publication Data
US 2004/0246508 A1    Dec. 9, 2004

Related U.S. Application Data

(60) Provisional application No. 60/460,354, filed on Apr. 4, 2003.

(51) Int. Cl.
  *B41J 2/01*    (2006.01)
  *B41J 29/13*   (2006.01)

(52) U.S. Cl. .................. 347/104; 347/101; 347/108

(58) Field of Classification Search ............. 347/104, 347/101, 108, 145; 400/691, 693
See application file for complete search history.

(56) References Cited

U.S. PATENT DOCUMENTS

| | | | |
|---|---|---|---|
| 3,948,505 A * | 4/1976 | Miller et al. ............... 271/303 |
| 4,515,458 A * | 5/1985 | Masuda et al. ............... 399/85 |
| 5,215,393 A | 6/1993 | Wincent |
| 5,478,161 A | 12/1995 | Suzuki et al. |
| 5,588,762 A | 12/1996 | Suzuki |
| 5,619,240 A * | 4/1997 | Pong et al. ............... 347/103 |
| 5,649,776 A | 7/1997 | Sugimoto et al. |
| 5,767,984 A | 6/1998 | Momonani |
| 5,921,686 A | 7/1999 | Baird et al. |
| 6,080,259 A * | 6/2000 | Nadeau et al. ............... 156/227 |
| 6,183,079 B1 * | 2/2001 | Meade et al. ............... 347/101 |
| 6,199,855 B1 * | 3/2001 | Choeng et al. ............... 271/122 |
| 6,267,522 B1 * | 7/2001 | Slippy et al. ............... 400/708.1 |
| 6,307,621 B1 * | 10/2001 | Endo et al. ............... 355/407 |
| 6,428,226 B1 | 8/2002 | Suzuki et al. |
| 6,447,186 B1 | 9/2002 | Oguchi et al. |
| 6,824,129 B2 * | 11/2004 | Sides, II ............... 271/3.14 |
| 6,877,854 B2 * | 4/2005 | Nishikawa ............... 347/104 |

(Continued)

FOREIGN PATENT DOCUMENTS

JP    61140457 A  *  6/1986

(Continued)

*Primary Examiner*—Stephen D Meier
*Assistant Examiner*—Leonard S Liang
(74) *Attorney, Agent, or Firm*—Panitch Schwarze Belisario & Nadel LLP

(57) ABSTRACT

A print media stacker assembly comprises a housing having an opening therein. A tray, disposed within the housing downstream of a feeder, has a front lip, a collecting portion, and a back wall. A stopper lever is in operative relationship with the tray a distance upstream from the back wall. The stopper lever has a first position in which the stopper lever prevents media sheets from passing beyond the stopper lever and a second position in which the stopper lever permits media sheets to pass beyond the stopper lever.

17 Claims, 2 Drawing Sheets

U.S. PATENT DOCUMENTS

| | | | |
|---|---|---|---|
| 6,926,272 B2 * | 8/2005 | Carter et al. | 271/258.01 |
| 2002/0051669 A1 | 5/2002 | Otsuka et al. | |
| 2004/0086310 A1 * | 5/2004 | Eskey | 399/401 |

FOREIGN PATENT DOCUMENTS

| | | | |
|---|---|---|---|
| JP | 62093129 A * | 4/1987 | |
| JP | 63060864 A * | 3/1988 | |
| JP | 02008160 A * | 1/1990 | |

* cited by examiner

PRINT MEDIA STACKER

CROSS-REFERENCE TO RELATED APPLICATIONS

This application claims the benefit of U.S. Provisional Patent Application No. 60/460,354, entitled "Paper Stacker", filed Apr. 4, 2003.

BACKGROUND OF THE INVENTION

The present invention relates generally to printer output devices, and more particularly to a print media stacker apparatus which prevents a user from having access to an output sheet until the printing operation is complete.

In many applications of printing devices, it is desirable that printed documents being output from the printing device not be accessible to a user until the printing operation is complete. If an over-anxious user pulls on a document while the printing operation is on-going, it is likely that the print media or substrate upon which the printing is being disposed will shift unpredictably relative to the printing device, and the quality of the printed document will be compromised. Furthermore, if the document is being printed and subsequently cut from a continuous roll of stock, pulling of the document from the printer before the cutting process is complete is likely to cause uneven cuts and possibly jamming of the document delivery device.

It is known in the art to provide printing devices with document delivery mechanisms which prevent a user from obtaining access to the document being printed and delivered from the printing device until printing and cutting operations are complete. For example, U.S. Pat. No. 5,215,393 (Wincent) ("the '393 patent") discloses a device for feeding documents, such as receipts or tickets, to a user from a printing apparatus. The invention of Wincent comprises means for preventing a user from having access to the printed receipt until the printing operation is complete and the receipt has been severed from a continuous roll of receipt paper stock. The invention of Wincent relies upon the printed document bowing upwardly in a predictable manner as illustrated in FIG. 1 of the '393 patent, and thus requires that the printed document be printed on a substrate having sufficient stiffness and being sufficiently short to allow the document to bow upward in an arc as shown.

A deficiency of the prior art is the inability of the document output devices to accommodate a combination of relatively light paper stock along with elongated document dimensions. For example, use of a less stiff paper stock or printing of documents substantially elongated relative to the proportions disclosed by Wincent would result in the upwardly bulged portion P2 in FIG. 1 collapsing in a generally unpredictable configuration, resulting in a significant probability of the document becoming jammed or the printed document being wrinkled or otherwise damaged.

There is a need, therefore, for an apparatus which would provide the benefits of preventing a user from obtaining access to a printed document until the printing and cutting operations are fully completed, but which would also accommodate a wide range of media or substrate stock weights and lengths.

BRIEF SUMMARY OF THE INVENTION

Briefly stated, the present invention is a print media stacker assembly comprising a housing having an opening therein. A feeder is disposed within the housing. A tray is disposed within the housing downstream of the feeder. The tray has a front lip, a collecting portion, and a back wall. The tray has a tray length measured from the lip to the back wall. A stopper lever is in operative relationship with the tray a distance upstream from the back wall. The stopper lever has a first position in which the stopper lever prevents media sheets from passing beyond the stopper lever. The stopper lever also has a second position in which the stopper lever permits media sheets to pass beyond the stopper lever.

In another aspect, the present invention is a print media stacker assembly for delivering individual media sheets having variable lengths to a user from a printer upon completion of printing. Each of the sheets have a first end and a second end. The print media stacker assembly comprises a housing having an opening therein. A tray is disposed within the housing downstream of the printer. The tray has a lip, a collecting portion, and a back wall. The tray has a tray length measured from the lip to the back wall. A stopper lever is disposed along the tray a distance upstream from the back wall. The stopper lever has a first position in which the stopper lever prevents sheets from passing beyond the stopper lever. The stopper lever also has a second position in which the stopper lever permits sheets to pass beyond the stopper lever. The sheets emerge from the printer and the first end of each sheet is directed to slide along the tray to abut one of the back wall and the stopper lever, thereby preventing each sheet from sliding further along the tray and causing the second end of each sheet to extend beyond the lip after passing from the printer such that the second end of each sheet is proximate the opening in the housing to allow the user to grasp each of the sheets.

In another aspect, the present invention is a print media stacker assembly for use with a printer and cutter assembly. The print media stacker assembly comprises a housing having an opening therein. A tray is disposed within the housing downstream of the printer for accepting media sheets cut into variable lengths by the cutter assembly. The tray has a front lip, a collecting portion, and a back wall. The tray has a tray length measured from the lip to the back wall. A stopper lever is in operative relationship with the tray a distance upstream from the back wall. The stopper lever has a first position in which the stopper lever prevents sheets from passing beyond the stopper lever. The stopper lever also has a second position in which the stopper lever permits sheets to pass beyond the stopper lever. The stopper lever is placed in the first position for sheets having lengths within a first range to allow a first end of each sheet to abut the stopper lever. The stopper lever is placed in the second position for sheets having lengths within a second range to allow the first end of each sheet to abut the back wall.

In another aspect, the present invention is a system for printing on media of variable lengths at the request of a user. The system comprises an input mechanism for allowing the user to select one of a plurality of media sheets having different lengths. A feeder has a supply of print media. A cutter assembly cuts media from the media supply into individual sheets. The sheets have variable lengths. The length of each sheet corresponds to the one selected length. A printer prints an image on the sheets. A tray accepts the printed sheets. The tray has a front lip, a collecting portion, and a back wall. A stopper lever is in operative relationship with the tray a distance upstream from the back wall. The stopper lever has a first position in which the stopper lever prevents the selected sheet from passing beyond the stopper lever. The stopper lever also has a second position in which the stopper lever permits the selected sheet to pass beyond the stopper lever.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the present invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
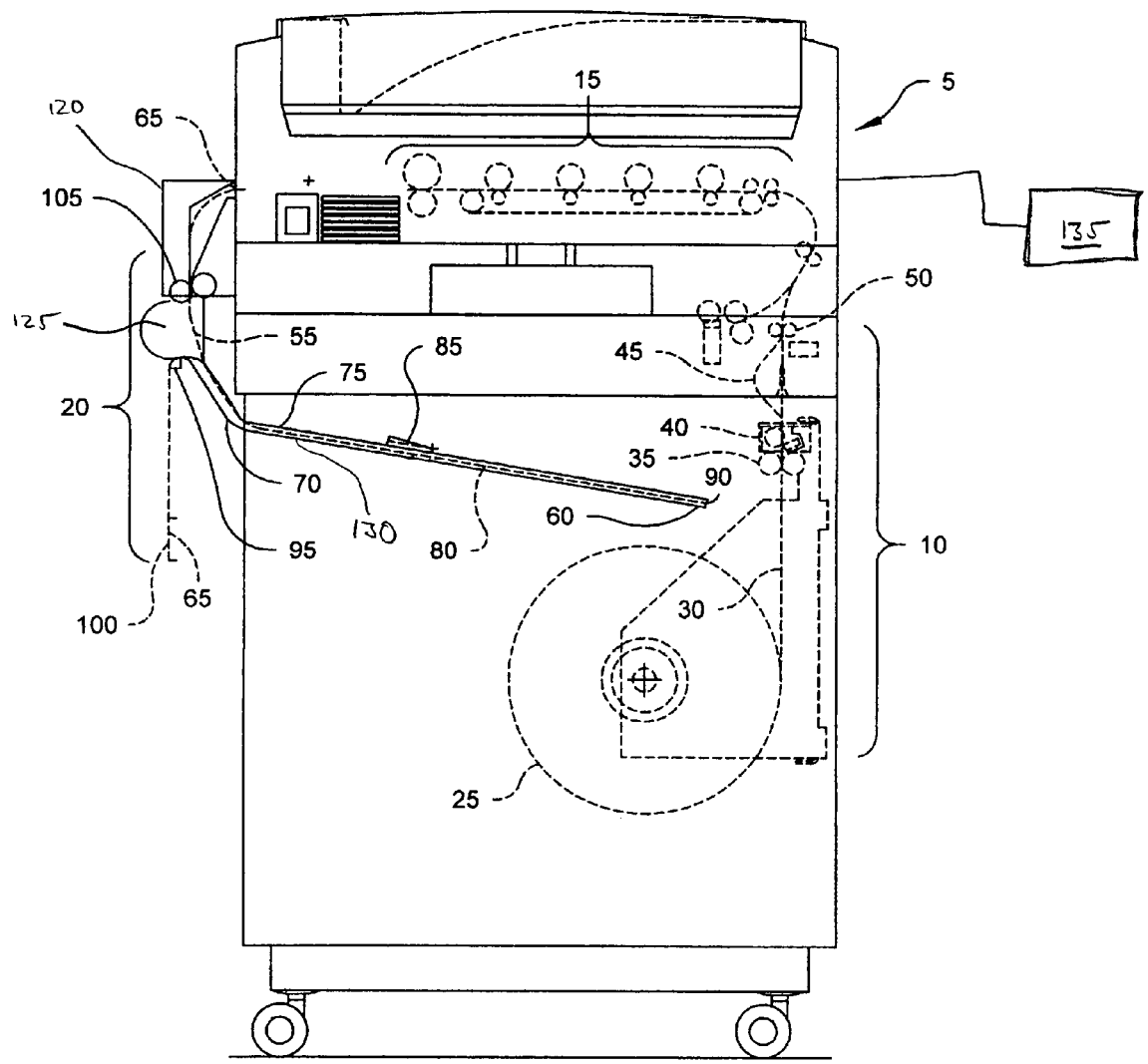
FIG. 1 is a side elevational view of a printer assembly which includes a media stacking apparatus in accordance with a preferred embodiment of the present invention.

Certain terminology is used in the following description for convenience only and is not limiting. The words "right," "left," "upper," and "lower" designate directions in the drawings to which reference is made. The terminology includes the words above specifically mentioned, derivatives thereof, and words of similar import.

Figure 2:
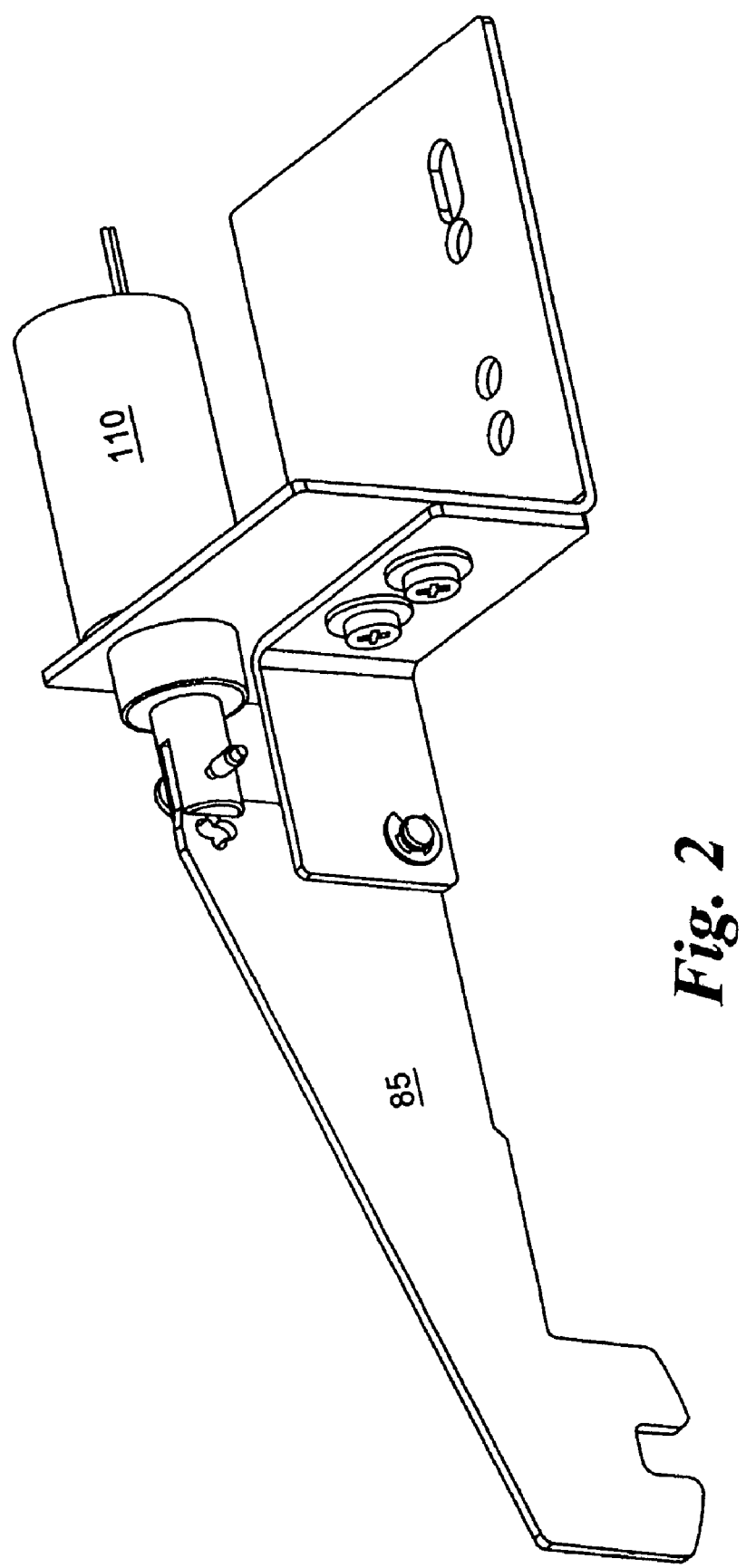
FIG. 2 is a perspective view of a solenoid and gate assembly incorporated into the media stacking apparatus of FIG. 1.

With reference to FIGS. 1 and 2, a printer assembly 5 comprises a continuous roll feeder and cutting apparatus shown generally at 10, a printer shown generally at 15 and a media stacker assembly shown generally at 20. The continuous roll feeder and cutting apparatus 10 includes a roll of printable media, in the present embodiment, paper 25, from which a paper web 30 feeds into the printer 15. The paper web 30 is engaged by two sets of pinch rollers 35 and 50 as well as by pinch rollers within the printer 15. The first set of pinch rollers 35 are driven to pull the paper web 30 from the roll 25. The second set of pinch rollers 50 is located downstream of a cutter assembly 40. The second set of rollers 50 is not driven, but serves to guide the paper web 30. The paper web 30 is severed at the cutter assembly 40 while the printing operation continues without pause. To accomplish this, the first set of pinch rollers 35 rotates at a higher rotational speed than do the rollers within the printer 15. A portion 45 of the web between the two sets of pinch rollers 35 and 50 thus becomes slack, as illustrated in phantom.

The media stacker assembly 20 comprises a housing 120 having an opening 125 therein. The media stacker assembly 20 operates to deliver to a user a sheet of print media or paper 55 with a first end 60 and a second end 65. The media stacker assembly 20 prevents a user from attempting to remove the sheet 55 before the printing operation is completed (that is, it is desired to prevent an overly-anxious user from pulling on the leading edge 60 of the sheet 55, in an attempt to expedite the process, while the printing process is on-going). A feeder, in the present embodiment, a set of pinch rollers 105, disposed within the housing 120 guides the sheet 55 onto a tray 70, also within the housing 120, downstream of the pinch rollers 105. The pinch rollers 105 are preferably fabricated from a rubber-like material possessing a sufficient coefficient of friction with the sheet 55 to enable gripping and pulling of the sheet 55. The tray 70 is constructed from conventional polymeric materials or metals in sheet form commonly used in office equipment housings.

The tray 70 includes a front lip 95, a collecting portion 130, and a back wall 90. The lip 95 is preferably disposed proximate the opening 125. The collecting portion 130 preferably extends downwardly and rearwardly into the housing 120, although it is within the spirit and scope of the present invention that the collecting portion 130 extend either upwardly or downwardly into the housing 120. The back wall 90 is disposed at an end of the tray 70 oppositely disposed from the lip 95. The tray 70 has a tray length measured from the lip 95 to the back wall 90.

An upper wall 75 is spaced from the tray 70 and extends at least partially along the collecting portion 130 of the tray 70 to define a cavity 80 therebetween. Preferably, the upper wall 75 extends from proximate the lip 95 to the back wall 90, although it is within the spirit and scope of the present invention that the upper wall 75 cover less or more of the tray 70. Alternatively, it is understood by those skilled in the art that the upper wall 75 could be eliminated without adversely affecting the operation of the media stacker assembly 20. The tray 70 and the upper wall 75 are oriented to enable the first end 60 of the sheet 55 to enter the cavity 80 from the pinch rollers 105. The cavity 80 has a height that is variable. The artisan would recognize from this disclosure that the height may be adjusted as a design choice to accommodate fewer or more sheets 55.

A stopper lever 85 is in operative relationship with the tray 70 a distance upstream from the back wall 90. The stopper lever 85 has a first position in which the stopper lever 85 is moved down into the cavity 80 by a solenoid 110 controlled by printer electronic controls (not shown) to block the path of the first end 60 of the sheet 55, thereby preventing the sheet 55 from passing beyond the stopper lever 85. The stopper lever 85 has a second position in which the stopper lever 85 is disposed at least substantially outside of the cavity 80 and permits the sheet 55 to pass beyond the stopper lever 85.

The stopper lever 85 is placed in the first position for sheets 55 having lengths within a first range to allow the first end 60 of each sheet 55 to abut the stopper lever 85. Preferably, the first range includes sheets 55 having lengths shorter than the tray length. The stopper lever 85 is placed in the second position for sheets 55 having lengths within a second range to allow the first end 60 of each sheet 55 to abut the back wall 90. Preferably, the second range includes sheets 55 having lengths longer than the tray length. By determining the length of the sheets 55, the media stacker assembly 20 controls the position of the stopper lever 85 such that the first end 60 of each sheet 55 abuts one of the stopper lever 85 and the back wall 90 to prevent the sheet 55 from sliding further along the tray 70 so that the second end 65 of each sheet 55 extends beyond the lip 95 after passing from between the pinch rollers 105. In this way, the second end 65 is proximate the opening 125 of the housing 120 to allow the user to grasp the sheet 55.

In operation, the first end 60 of the printed sheet 55 emerges from the printer 15 and is directed by the pinch rollers 105 directly into the tray 70 of the media stacker assembly 20. In this manner the first end 60 of the sheet 55 is not readily accessible by the user. The sheet 55 continues to feed into the cavity 80 until the progress of the sheet 55 is impeded by the stopper lever 85 or by the rear wall 90 of the cavity 80. To accomplish the objective of making the printed sheet 55 accessible to the user only after the printing operation is complete, when the sheet 55 has been completely fed through pinch rollers 105, the second end 65 falls into a position 100 where the second end 65 of the sheet 55 hangs over the lip 95 of the tray 70 and is thus accessible to the user.

For the first range of relatively short lengths of the sheet 55, the electronic controls (not shown) of the device will recognize that the stopper lever 85 must be moved down into the cavity 80 and into the first position to block the progress of the first end 60 of the sheet 55 within the cavity 80 in order for the second end 65 of the sheet 55 to extend beyond the lip 95 of the tray 70 (and thus be readily accessible by a user) after the sheet 55 has been fully fed through pinch rollers 105. A signal from the electronic controls (not shown) activates the solenoid 110 to pivot the stopper lever 85 into the first position to block the progress of the first end 60.

For the second range of relatively longer lengths of the sheet 55, the stopper lever 85 is maintained in the second position and the first end 60 may progress through the cavity 80 fully to the rear wall 90. The length of the sheet 55 is sufficient such that the second end 65 extends beyond the lip 95. Thus, when the printed sheet 55 falls within this second range of lengths, the electronic controls (not shown) move the solenoid 110 to pivot the stopper lever 85 into the second position out of the path of the first end 60. Note that additional stopper levers (not shown) could be added between stopper lever 85 and the rear wall 90 to accommodate sheets 55 with lengths between the first range and the second range.

In another preferred embodiment, the present invention is a system 5 for printing on print media or paper 55 of variable lengths at the request of a user. The system 5 comprises an input mechanism 135 for allowing the user to select one of a plurality of print media having different lengths. The input mechanism 135 can take the form of any appropriate mechanism to enable the user to communicate the selected sheet 55 with the system 5 including, but not limited to, a keypad, a keyboard, a touch screen, or the like. A feeder and cutter assembly 10 cuts media such as paper 30 from a supply of media or paper 25 into individual sheets 55. The sheets 55 have variable lengths that correspond to the one selected media length. A printer 15 prints an image on the sheet 55. A tray 70 accepts the printed sheet 55. The tray 70 has a front lip 95, a collecting portion 130, and a back wall 90. A stopper lever 85 is in operative relationship with the tray 70 a distance upstream from the back wall 90. The stopper lever 85 has a first position in which the stopper lever 85 prevents the selected sheet 55 from passing beyond the stopper lever 85. The stopper lever 85 also has a second position in which the stopper lever 85 permits the selected sheet 55 to pass beyond the stopper lever 85.

The stopper lever 85 is controlled in response to the selection of the sheet 55 by the user. That is, the user selects a particular sheet 55 to be printed having a length. The system 5 determines whether the length of the selected sheet 55 requires the stopper lever 85 to be in either the first position or the second position to enable the sheet 55 to be accessible to the user, such that a first end 60 of the selected sheet 55 is directed from the printer 15 toward the tray 70 and slides along the tray 70 to abut one of the back wall 90 (when the stopper lever 85 is in the second position) and the stopper lever 85 (when the stopper lever 85 is in the first position). The first end 60 is selectively prevented from sliding further along the tray by one of the back wall 90 and the stopper lever 85 to cause a second end 65 of the selected sheet 55 to extend beyond the lip 95 after passing from the printer 15 such that the second end 65 of the selected sheet 55 can be grasped by the user upon completion of printing of the selected sheet 55. In this way, the cutting and printing process without interference from the user.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention.

We claim:

1. A print media stacker assembly comprising:
   a housing having an opening therein;
   a feeder disposed within the housing;
   a tray disposed within the housing downstream of the feeder, the tray having a front lip, a collecting portion, and a back wall, the tray having a tray length measured from the lip to the back wall; and
   a stopper lever in operative relationship with the tray a distance upstream from the back wall, the stopper lever having a first position in which the stopper lever prevents media sheets from passing beyond the stopper lever and a second position in which the stopper lever permits media sheets to pass beyond the stopper lever,
   wherein the feeder pulls a sheet of media from a printer and directs a first end of the sheet toward the tray such that the sheet slides along the tray and abuts one of the back wall and the stopper lever, thereby preventing the sheet from sliding further along the tray and causing a second end of the sheet to extend beyond the lip after passing from the feeder such that the second end of the sheet is exposed proximate the opening in the housing to allow the user to grasp the sheet.

2. The print media stacker assembly of claim 1 further comprising an upper wall spaced from the tray and extending at least partially along the collecting portion of the tray to define a cavity therebetween.

3. The print media stacker assembly of claim 1 wherein the stopper lever is placed in the first position for sheets having lengths within a first range to allow the first end of each sheet to abut the stopper lever.

4. The print media stacker assembly of claim 3 wherein the first range includes sheets having lengths shorter than the tray length.

5. The print media stacker assembly of claim 1 wherein the stopper lever is placed in the second position for sheets having lengths within a second range to allow the first end of each sheet to abut the back wall.

6. The print media stacker assembly of claim 5 wherein the second range includes sheets having lengths longer than the tray length.

7. A print media stacker assembly for delivering individual media sheets having variable lengths to a user from a printer upon completion of printing, each of the sheets having a first end and a second end, the print media stacker assembly comprising:
   a housing having an opening therein;
   a tray disposed within the housing downstream of the printer, the tray having a lip, a collecting portion, and a back wall, the tray having a tray length measured from the lip to the back wall; and
   a stopper lever disposed along the tray a distance upstream from the back wall, the stopper lever having a first position in which the stopper lever prevents sheets from passing beyond the stopper lever and a second position in which the stopper lever permits sheets to pass beyond the stopper lever,
   wherein the sheets emerge from the printer and the first end of each sheet is directed to slide along the tray to abut one of the back wall and the stopper lever, thereby preventing each sheet from sliding further along the tray and causing the second end of each sheet to extend beyond the lip after passing from the printer such that the second end of each sheet is proximate the opening in the housing to allow the user to grasp each of the sheets.

8. The print media stacker assembly of claim 7 further comprising a pair of pinch rollers disposed within the housing downstream of the printer for pulling the sheets from the printer.

9. The print media stacker assembly of claim 7 further comprising an upper wall spaced from the tray and extending at least partially along the collecting portion of the tray to define a cavity therebetween.

10. The print media stacker assembly of claim 7 wherein the stopper lever is placed in the first position for sheets having lengths within a first range to allow the first end of each sheet to abut the stopper lever.

11. The print media stacker assembly of claim 7 wherein the stopper lever is placed in the second position for sheets having lengths within a second range to allow the first end of each sheet to abut the back wall.

12. A print media stacker assembly for use with a printer and cutter assembly, the print media stacker assembly comprising:
   a housing having an opening therein;
   a tray disposed within the housing downstream of the printer for accepting media sheets cut into variable lengths by the cutter assembly, the tray having a front lip, a collecting portion, and a back wall, the tray having a tray length measured from the lip to the back wall; and
   a stopper lever in operative relationship with the tray a distance upstream from the back wall, the stopper lever having a first position in which the stopper lever prevents sheets from passing beyond the stopper lever and a second position in which the stopper lever permits sheets to pass beyond the stopper lever, the stopper lever being placed in the first position for sheets having lengths within a first range to allow a first end of each sheet to abut the stopper lever, and the stopper lever being placed in the second position for sheets having lengths within a second range to allow the first end of each sheet to abut the back wall, the second range including sheets having lengths longer than the tray length.

13. The print media stacker assembly of claim 12 wherein the first end of each sheet is directed from the printer toward the tray such that the sheet slides down the tray and abuts one of the back wall and the stopper lever, thereby preventing the sheet from sliding further along the tray and causing a second end of the sheet to extend beyond the lip after passing from the printer such that the second end of the sheet is proximate the opening in the housing to allow the user to grasp the sheet.

14. The print media stacker assembly of claim 12 wherein the first range includes sheets having lengths shorter than the tray length.

15. The print media stacker assembly of claim 12 further comprising an upper wall spaced from the tray and extending at least partially along the collecting portion of the tray to define a cavity therebetween.

16. A system for printing on media of variable lengths at the request of a user, the system comprising:
   an input mechanism for allowing the user to select one of a plurality of media sheets having different lengths;
   a feeder having a supply of print media;
   a cutter assembly for cutting media from the media supply into individual sheets, the sheets having variable lengths, the length of each sheet corresponding to the one selected length;
   a printer for printing an image on the sheets;
   a tray for accepting the printed sheets, the tray having a front lip, a collecting portion, and a back wall; and
   a stopper lever in operative relationship with the tray a distance upstream from the back wall, the stopper lever having a first position in which the stopper lever prevents the selected sheet from passing beyond the stopper lever and a second position in which the stopper lever permits the selected sheet to pass beyond the stopper lever,
   wherein a first end of the selected sheet is directed from the printer toward the tray such that the selected sheet slides along the tray and abuts one of the back wall and the stopper lever, thereby preventing the selected sheet from sliding further along the tray and causing a second end of the selected sheet to extend beyond the lip after passing from the printer such that the second end of the selected sheet can be grasped by the user.

17. The system of claim 16 wherein the stopper lever is controlled in response to the selection of the length of the sheet.

* * * * *